US012679636B2

(12) United States Patent
Chen

(10) Patent No.: US 12,679,636 B2
(45) Date of Patent: Jul. 14, 2026

(54) CLAMP-TYPE HEAT-SEALING STRUCTURE FOR TRASH CAN

(71) Applicant: EKO GROUP LTD, Jiangmen (CN)

(72) Inventor: Yizhi Chen, Jiangmen (CN)

(73) Assignee: EKO GROUP LTD, Jiangmen (CN)

( * ) Notice: Subject to any disclaimer, the term of this patent is extended or adjusted under 35 U.S.C. 154(b) by 0 days.

(21) Appl. No.: 19/296,984

(22) Filed: Aug. 12, 2025

(65) Prior Publication Data

US 2025/0368432 A1 Dec. 4, 2025

(30) Foreign Application Priority Data

Oct. 30, 2024 (CN) ........................ 202422649855.9

(51) Int. Cl.
*B65B 51/30* (2006.01)
*B65F 1/06* (2006.01)
*B65F 1/14* (2006.01)
*B65F 1/16* (2006.01)

(52) U.S. Cl.
CPC .............. *B65F 1/062* (2013.01); *B65B 51/30* (2013.01); *B65F 1/06* (2013.01); *B65F 1/14* (2013.01); *B65F 1/16* (2013.01); *B65F 1/1607* (2013.01); *B65F 1/1646* (2013.01); *B65F 2001/1653* (2013.01); *B65F 2210/167* (2013.01)

(58) Field of Classification Search
USPC ........................................................ 53/375.9
See application file for complete search history.

(56) References Cited

U.S. PATENT DOCUMENTS

2019/0381747 A1* 12/2019 Qiu .................... B29C 65/7433
2019/0382197 A1* 12/2019 Li ......................... B65F 1/1415
2023/0219748 A1* 7/2023 Ye ......................... B65F 1/1405
220/495.08

FOREIGN PATENT DOCUMENTS

CN 106564717 B 12/2019

* cited by examiner

*Primary Examiner* — Chinyere J Rushing-Tucker

(57) ABSTRACT

A clamp-type heat-sealing structure for a trash can includes a heat-sealing unit and a strap. The heat-sealing unit includes a first clamping arm and a second clamping arm. The first clamping arm includes a connecting end and an articulated end. The connecting end is connected with the strap. The second clamping arm is located at a side of the articulated end. The strap is configured to drive the first clamping arm to rotate around the articulated end to be close to or away from the second clamping arm. The second clamping arm includes a heat insulating base and a heating element. The heat insulating base is provided with a heat-pressing surface, and the heating element is arranged on the heat-pressing surface. The first clamping arm is provided with a pressing surface, and the pressing surface is configured to clamp the garbage bag with the heat-pressing surface.

10 Claims, 10 Drawing Sheets

CLAMP-TYPE HEAT-SEALING STRUCTURE FOR TRASH CAN

CROSS-REFERENCE TO RELATED APPLICATIONS

This application claims the benefit of priority from Chinese Patent Application No. 202422649855.9, filed on Oct. 30, 2024. The content of the aforementioned application, including any intervening amendments thereto, is incorporated herein by reference in its entirety.

TECHNICAL FIELD

This application relates to trash cans, and more particularly to a clamp-type heat-sealing structure for a trash can.

BACKGROUND

Traditional trash can, when filled with garbage, requires manual packing, which not only makes cumbersome operation, but also easily dirties hands and is unhygienic. With the development of technology, some smart trash cans that can automatically pack garbage bags have emerged in the market, which has significantly enhanced automation degree in garbage disposal. The smart trash can usually adopts one or two pressure rods/plates to press an opening of a garbage bag towards an edge of the opening of the trash can, and then a sealing device cooperates with the pressure rods/plates to complete sealing and packaging.

In the prior art, Chinese Patent No. 106564717B developed an automatic heat-sealing device for garbage bag for trash cans and method thereof, where a clamping plate is configured to be pushed by a driving mechanism to move towards a heating module, and when the clamping plate is contact with the heating mechanism, the opening of the garbage bag is closed, at this time, the heating module is started to melt the opening of the garbage bag. However, the prior art still has the following disadvantages in practical application.

(1) The clamping plate and the heating module are made of rigid materials, and have relatively large contact area, which helps improve sealing efficiency, while easily causes damage to the garbage bag caused by excessive heating, affecting packaging effect and subsequent processing. Even in the process of sealing, if the heating module generates an excessively high temperature, it is easy to cause damage to other internal components of the trash can or lead to safety hazards, such as fires.

(2) Due to light and thin material of the garbage bag, it is prone to be stuck at corners of the pressure plates or pressure rods, which makes it impossible to close the garbage bag or even directly damages the garbage bag, reducing the user experience.

(3) Most of a side of the pressure plate/pressure rod that is contact with the heating module has a flat structure. Once the flat structure bends, the garbage bag after being pressed cannot be fully contact with the heating module, which is easy to causes poor sealing of the garbage bag and will also reduce the reliability and practicality of packaging.

Therefore, it is an urgent need for a clamp-type heat-sealing structure for a trash can, which enables the trash can to better realize the sealing of the garbage bag and solves the above problems.

SUMMARY

In view of the above problems, this application provides a clamp-type heat-sealing structure for a trash can to solve relevant technical problems in the prior art. In this application, a first end of a first clamping arm is configured to be a rotation pivot, and a second end of the first clamping arm is configured to be a movable end. The first clamping arm as a whole is configured to flexibly rotate relative to a second clamping arm which is fixedly provided, so as to realize an action of opening or tightly closing of the clamp-type heat-sealing structure. Through a carefully designed clamping mechanism in combination with synergy of the first clamping arm and the second clamping arm, the clamp-type heat-sealing structure is endowed with a clamping capability similar to that of a clamp, which effectively improves fuse sealing efficiency on a garbage bag after being closed of the clamp-type heat-sealing structure, making it more practical.

Technical solutions of this application are described as follows.

A clamp-type heat-sealing structure for a trash can is provided, comprising:

a heat-sealing unit; and a strap;

wherein the heat-sealing unit and the strap are arranged on an opening of the trash can; and the clamp-type heat-sealing structure is configured to thermally seal a garbage bag after being closed;

the heat-sealing unit comprises a first clamping arm and a second clamping arm; the first clamping arm comprises a connecting end and an articulated end; the connecting end of the first clamping arm is connected with the strap; the strap is configured to be gathered under the drive of an external force to close a garbage bag; the second clamping arm is located at a side of the articulated end of the first clamping arm; and the strap is configured to drive the first clamping arm to rotate around the articulated end to be close to or away from the second clamping arm; and the second clamping arm comprises a heat insulating base and a heating element; the heating element is configured to heat and seal the garbage bag; a side of the heat insulating base facing towards the garbage bag is provided with a heat-pressing surface; the heat-pressing surface is arranged along a length direction of the second clamping arm, and the heating element is arranged on the heat-pressing surface; a side of the first clamping arm facing towards the garbage bag is provided with a pressing surface, and the pressing surface is configured to clamp the garbage bag with the heat-pressing surface.

In an embodiment, the articulated end of the first clamping arm is rotatably connected with the opening of the trash can through a rotation mechanism; a position of the first clamping arm away from the rotation mechanism is protrudedly provided with a pressing platform; and the pressing surface is formed on a side of the pressing platform.

In an embodiment, the rotation mechanism comprises a rotating shaft and a rotating groove; the rotating shaft is provided on the opening of the trash can; the first clamping arm is provided with the rotating groove; the rotating shaft is arranged in the rotating groove; and the rotating groove is configured to rotate around the rotating shaft; and the first clamping arm has a 7-shaped cross section; and the rotating groove is connected with the pressing platform through a corner.

In an embodiment, the second clamping arm comprises two protrusions; the two protrusions are provided on an end of the heat insulating base close to the rotation mechanism; each of the two protrusions is configured to protrude from the heat-pressing surface; and the two protrusions are symmetrically arranged along a vertical direction.

In an embodiment, the first clamping arm is provided with two connecting grooves, and the two connecting grooves are symmetrically arranged on two sides of the pressing platform along a vertical direction; and the pressing platform is provided with a connecting hole; and the two connecting grooves are communicated with each other through the connecting hole.

In an embodiment, an end of the second clamping arm away from the heat insulating base is provided with a flange; the flange is configured to protrude along the length direction of the second clamping arm.

In an embodiment, the second clamping arm comprises a first limit groove, a second limit groove and a third limit groove; the first limit groove is provided on an end of the heat insulating base away from the flange; the second limit groove is provided at an end of the flange away from the first clamping arm; the third limit groove is arranged at a middle of the heat-pressing surface; a first end of the third limit groove is communicated with the first limit groove, and a second end of the third limit groove is communicated with the second limit groove; the first limit groove, the second limit groove and the third limit groove are located on the same plane; the heating element comprises a first end portion, an extension portion and a second end portion connected in sequence; the first end portion is arranged in the first limit groove; the extension portion is configured to extend from an end of the first limit groove along the third limit groove; and the second end portion is arranged in the second limit groove.

In an embodiment, the heating element is a strip-shaped heating wire; the third limit groove is arranged along the length direction of the second clamping arm; and in response to a case that the heating wire is located in the third limit groove, the heating wire partially protrudes from the heat-pressing surface.

In an embodiment, a top of the heat insulating base is provided with a mounting groove; a bottom of the heat insulating base is provided with a mounting hole; the mounting groove is communicated with the mounting hole; the opening of the trash can is provided with a mounting part and a fastening component; the mounting part is provided at the mounting groove; and the fastening component is configured to sequentially pass through the mounting part and the mounting hole for fastening.

In an embodiment, the heat-sealing unit, except for the heating element, is made of a heat-insulating material; and the heating element is electrically connected with a heating circuit.

This application has the following beneficial effects.

(1) The articulated end of the first clamping arm is configured as the axis, and the connecting end of the first clamping arm is configured to drive the whole first clamping arm to open or close relative to the second clamping arm. Through the designed clamping mechanism of the first clamping arm and the second clamping arm, the heat-sealing unit has the clamping capability similar to that of a clamp, which effectively improves fuse sealing efficiency on a garbage bag after being closed. The strap is a key to drive the first clamping arm to rotate, and the strap is driven to be continuously gathered under the drive of an external force, so as to gradually drive the garbage bag to a fusing area of the heat-sealing unit. Moreover, the strap also drives the first clamping arm to clamp against the second clamping arm. Through one power source (i.e., the strap), this application can realize multiple objects, which greatly simplifies the complexity of the overall structure and reduces the manufacturing cost.

(2) The pressing surface of the first clamping arm is configured to tighteningly clamp with the heat-pressing surface of the second clamping arm, which ensures the integrity and sealing of the fused sealing, such design greatly simplifies the steps of sealing the garbage bag, improves the sealing efficiency, and is easy to operate.

(3) The design of the heat insulating base and the heat-pressing surface ensures that heat can be concentrated and evenly applied to the garbage bag, which avoids safety hazards caused by heat loss or local overheating.

In Figures: 1, first clamping arm; 11, pressing platform; 111, pressing surface; 12, rotating groove; 13, corner; 14, avoidance groove; 15, connecting groove; 151, connecting hole; 16, connecting end; 17, articulated end; 2, second clamping arm; 21, heat insulating base; 211, heat-pressing surface; 212, protrusion; 2131, first limit groove; 2132, second limit groove; 214, third limit groove; 215, mounting groove; 2151, mounting hole; 22, flange; 3, strap; 4, heating element; 41, first end portion; 42, extension portion; and 43, second end portion.

DETAILED DESCRIPTION OF EMBODIMENTS

The technical solutions of the embodiments of the present disclosure will be clearly and completely described with reference to the accompanying drawings of the embodiments of the present disclosure. It is obvious that described herein are only some embodiments of the present disclosure, rather than all embodiments. Based on the embodiments of the present disclosure, other embodiments obtained by those of ordinary skill in the art without making creative effort shall fall within the scope of the present disclosure.

In the disclosure, it should be noted that the terms, such as "central", "longitudinal", "transverse", "lengthwise", "widthwise", "thickness", "up", "down", "left", "right", "front", "rear", "vertical", "horizontal", "top", "bottom", "inner", "outer", "inside", "outside", "inner end", "outer end", "axial", "radial", "circumferential" and other directional indications used herein, are only used for illustrating relative position relationship and motion between components in a specific state (as shown in the accompanying drawings), rather than limiting the disclosure.

Figure 1:
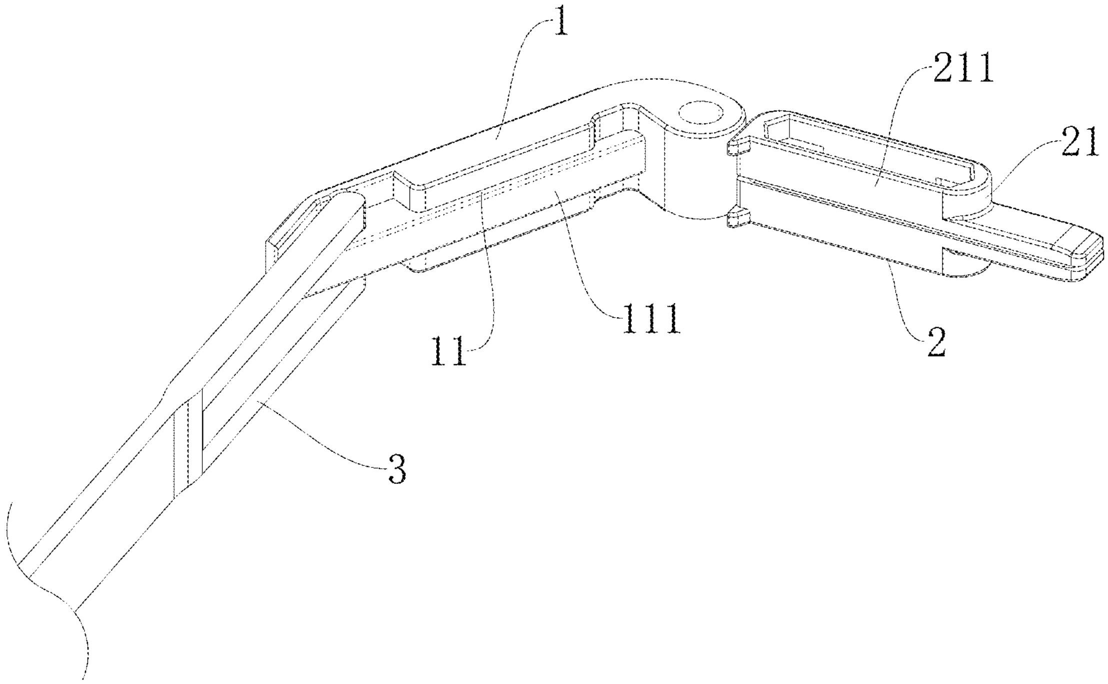
FIG. 1 is a structural diagram of a clamp-type heat-sealing structure for a trash can according to an embodiment of the present disclosure.
Figure 2:
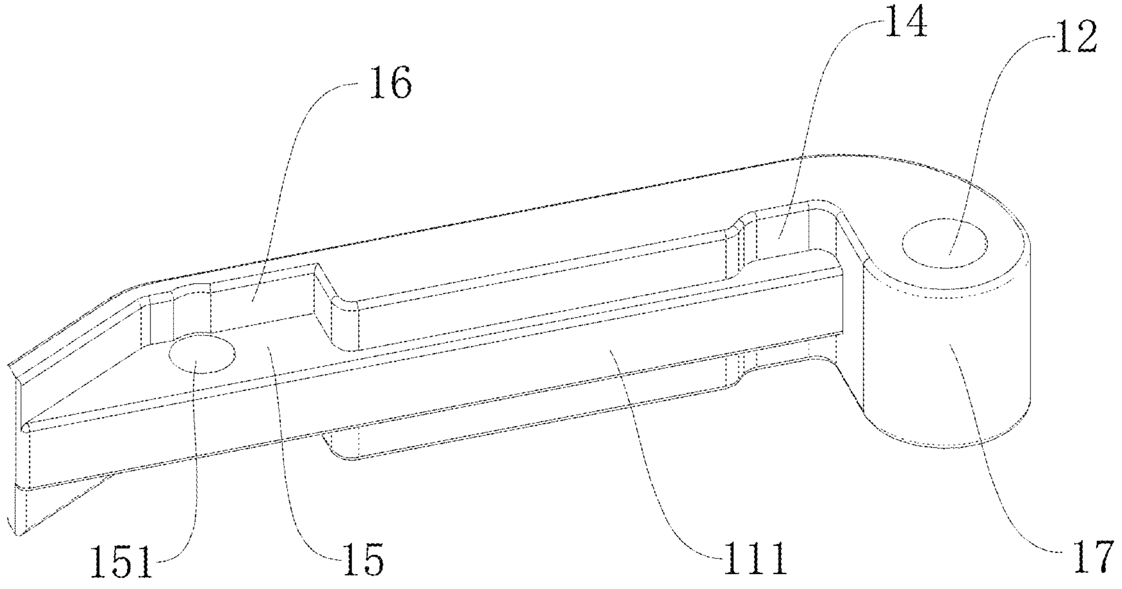
FIG. 2 is a structural diagram of a first clamping arm according to an embodiment of the present disclosure.
Figure 3:
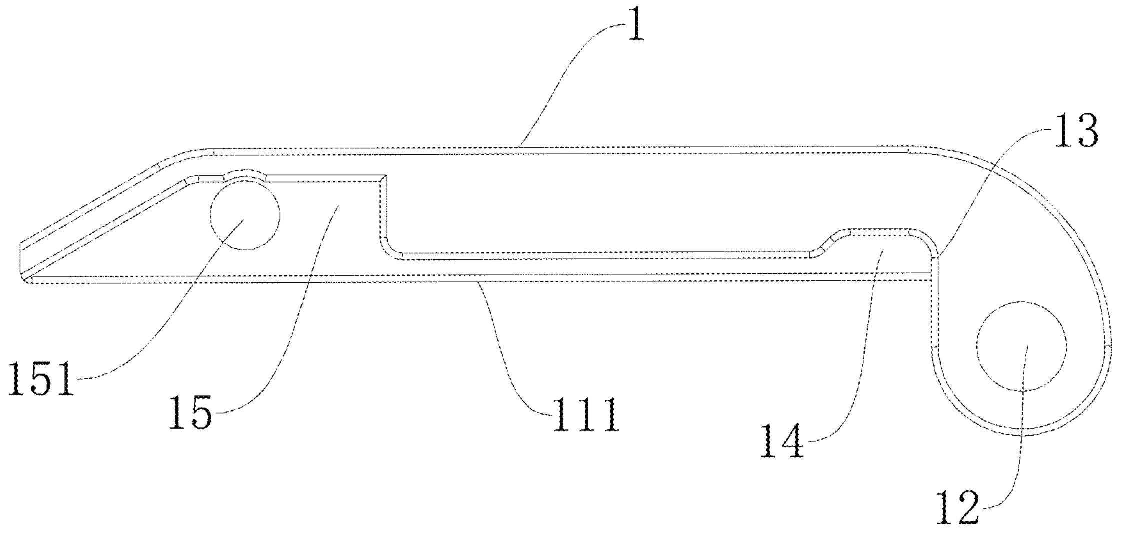
FIG. 3 is a top view of the first clamping arm according to an embodiment of the present disclosure.
Figure 4:
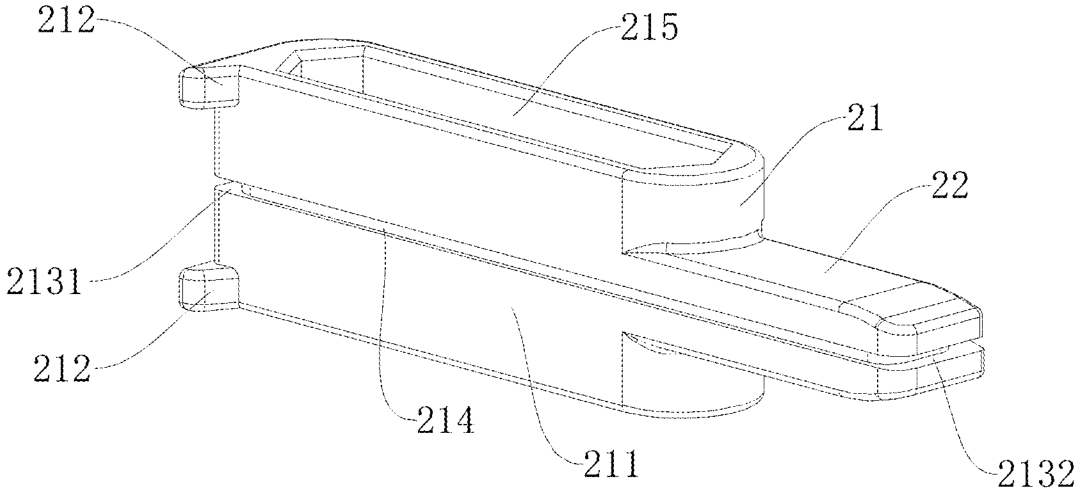
FIG. 4 is a structural diagram of a second clamping arm according to an embodiment of the present disclosure.
Figure 5:
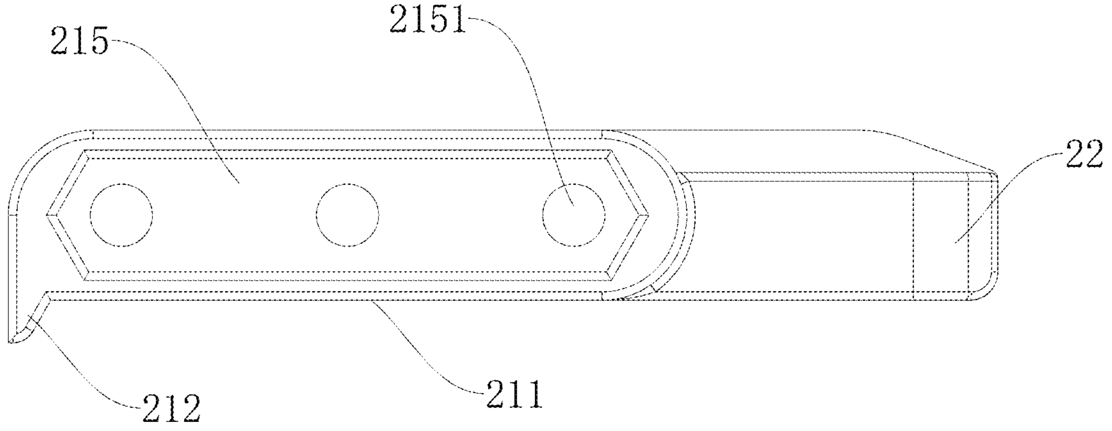
FIG. 5 is a top view of the second clamping arm according to an embodiment of the present disclosure.
Figure 6:
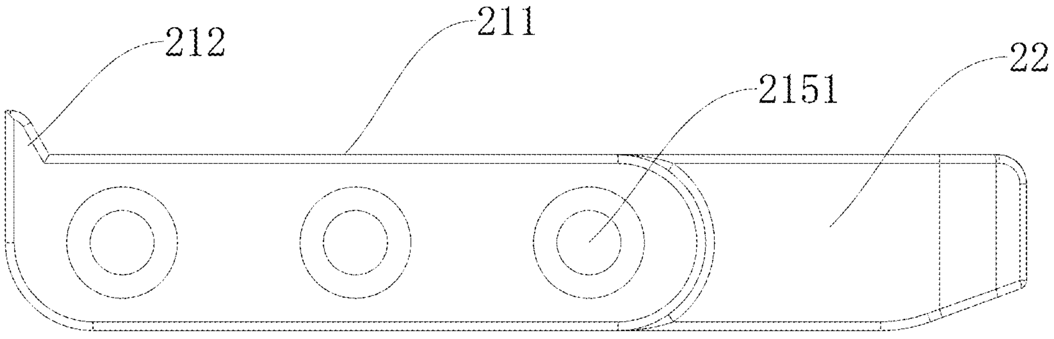
FIG. 6 is a bottom view of the second clamping arm according to an embodiment of the present disclosure.
Figure 7:
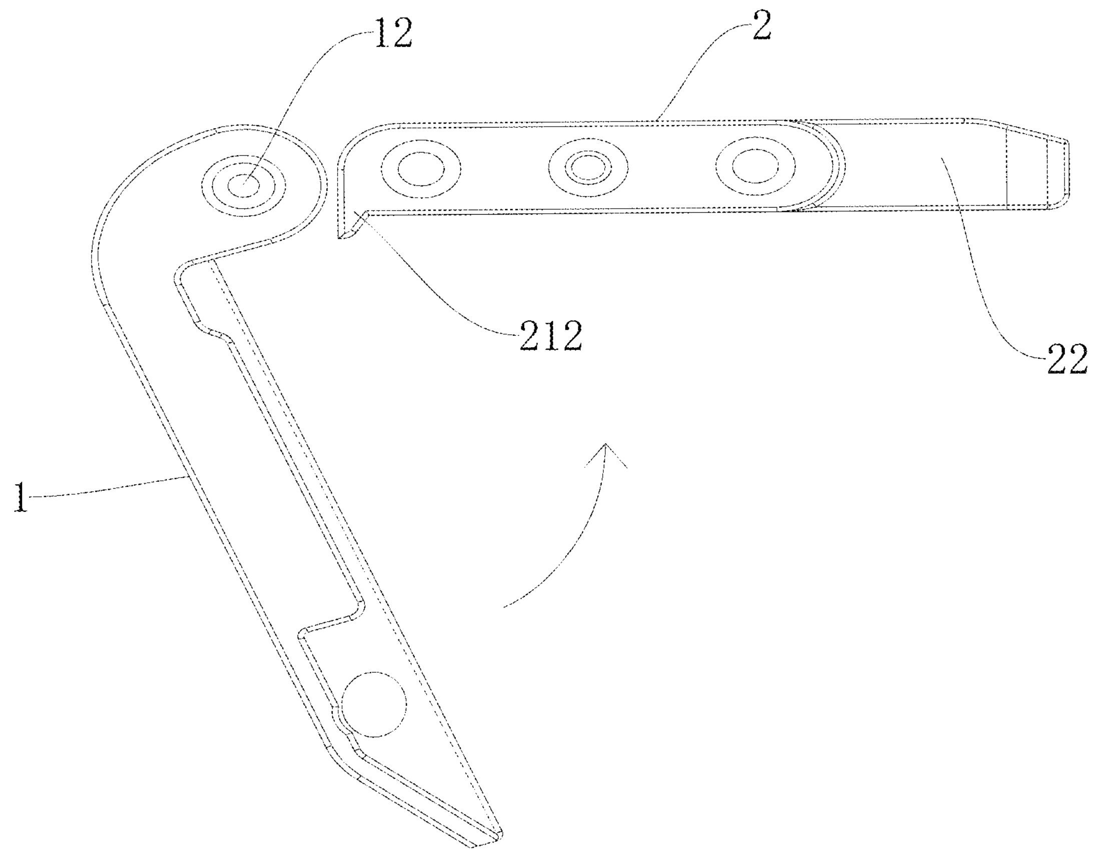
FIG. 7 is working schematic diagram of the first clamping arm rotating towards the second clamping arm according to an embodiment of the present disclosure.
Figure 8:
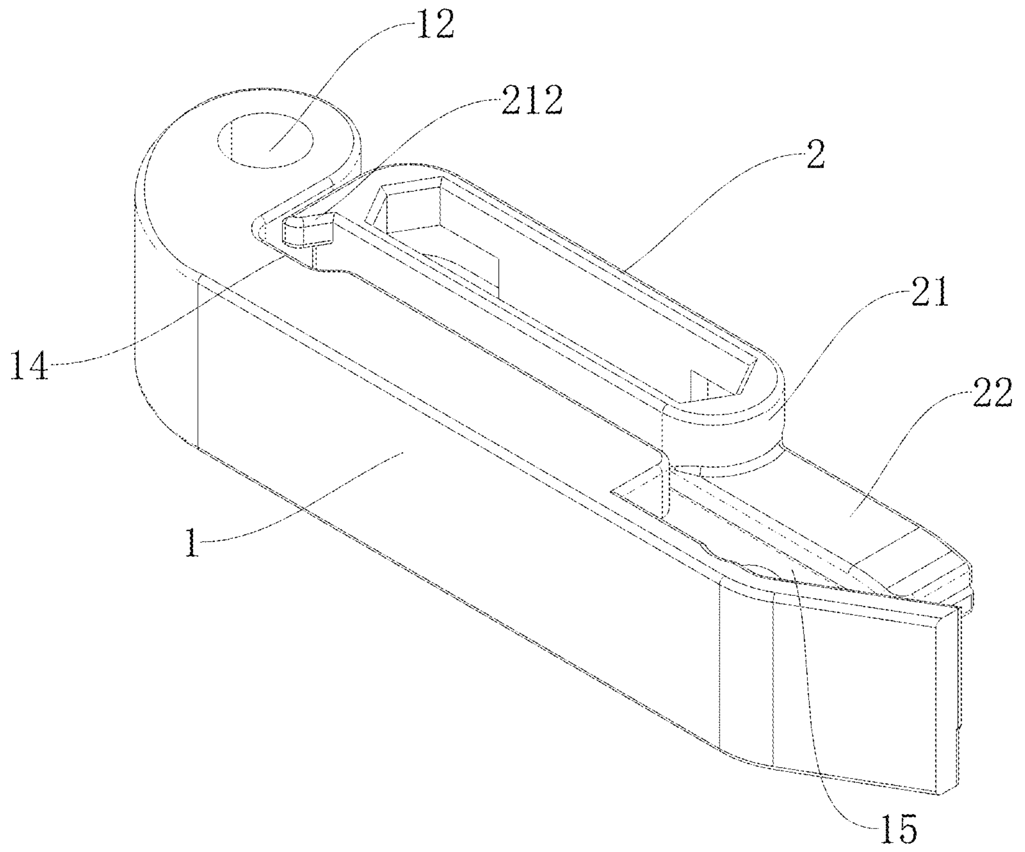
FIG. 8 is a structural diagram of clamping between the first clamping arm and the second clamping arm according to an embodiment of the present disclosure.

Referring to FIGS. 1-2, a clamp-type heat-sealing structure for a trash can includes a heat-sealing unit and a strap 3. The clamp-type heat-sealing structure is configured to thermally seal a garbage bag after being closed.

The heat-sealing unit includes a first clamping arm 1 and a second clamping arm 2. The first clamping arm 1 includes a connecting end 16 and an articulated end 17. The connecting end 16 of the first clamping arm 1 is connected with the strap 3. The strap 3 is configured to be gathered under the drive of an external force to close a garbage bag. The articulated end 17 of the first clamping arm 1 is rotatably connected with the opening of the trash can. The second clamping arm 2 is fixedly provided on the opening of the trash can. The second clamping arm 2 is located at a side of the articulated end 17 of the first clamping arm 1. The strap 3 is configured to drive the first clamping arm 1 to rotate around the articulated end 17 to be close to or away from the second clamping arm 2.

The second clamping arm 2 includes a heat insulating base 21 and a heating element 4. The heat insulating base 21 is located the side of the articulated end 17. The heating element 4 is configured to heat and seal the garbage bag. A side of the heat insulating base 21 facing towards the garbage bag is provided with a heat-pressing surface 211. The heat-pressing surface 211 is arranged along a length direction of the second clamping arm 2, and the heating element 4 is arranged on the heat-pressing surface 211. A side of the first clamping arm 1 facing towards the garbage bag is provided with a pressing surface 111, and the pressing surface 111 is configured to clamp the garbage bag with the heat-pressing surface 211.

The clamp-type heat-sealing structure for a trash can provided in this embodiment, through the designed clamping mechanism of the first clamping arm 1 and the second clamping arm 2, makes the heat-sealing unit have the clamping capability similar to that of the clamp, which effectively improves fuse sealing efficiency on a garbage bag after being closed. Under the drive of the strap 3, the first clamping arm 1 is configured to rotate around a rotating shaft of the articulated end 17, so as to drive the connecting end 16 to be close to the second clamping arm 2 and clamp with the second clamping arm 2. In this process, the heating element 4 on the second clamping arm 2 is configured to heat a plastic material of the garbage bag, which not only melts the garbage bag, but also causes materials on both sides of a cut to soften and partially fuse due to high temperature to form an initial sealing. At the same time, the pressing surface 111 of the first clamping arm 1 is tightly clamped with the heat-pressing surface 211 of the second clamping arm 2 during heating process, and applied pressure can enable the molten plastic material to fully contact and melt. Then, the plastic material solidifies to form a well-sealed sealing. A flat design of the pressing surface 111 and the heat-pressing surface 211 can ensure uniform pressure distribution, avoiding poor fusion caused by insufficient local pressure. Therefore, the clamp-type heat-sealing structure of the present disclosure can ensure the integrity and sealing of the molten sealing, such design greatly simplifies sealing mechanism of the garbage bag, improves the sealing efficiency, and is easy to operate.

At the same time, the operation clamping operation mode integrates the heating element 4 inside the second clamping arm 2. When the first clamping arm 1 and the second clamping arm 2 are closed, the heating element 4 is completely wrapped within the first clamping arm 1 and the second clamping arm 2, isolating direct contact between the operator and the heating element 4, and reducing possible accidental injury during the heating element 4 seals, which further enhances using safety of the product.

The first clamping arm 1 is provided with a pressing platform 11 configured to extend from the articulated end 17 to the connecting end 16, and the pressing surface 111 is formed on a side of the pressing platform 11.

In an embodiment, the clamp-type heat-sealing structure further includes the rotating shaft and a rotating groove 12. The rotating shaft is provided on the opening of the trash can. The articulated end 17 of the first clamping arm is provided with the rotating groove 12. The rotating groove 12 is arranged along the articulated end 17. The rotating shaft is pivotally connected to the rotating groove 12. The rotating groove 12 is configured to rotate around the rotating shaft. The strap 3 is configured to drive the first clamping arm 1 to rotate around an axis of the rotating groove 12.

Referring to FIGS. 3-8, the first clamping arm 1 has a 7-shaped cross section. The axis of the rotating groove 12 is configured to deviate from the pressing platform 11 in a direction close to the second clamping arm 2. A corner 13 is formed between the pressing surface 111 and a plane passing through the axis of the rotating groove 12, and the corner 13 is 90°.

In an embodiment, the second clamping arm 2 includes two protrusions 212. The two protrusions 212 are provided on an end of the heat insulating base 21 close to the articulated end. Each of the two protrusions 212 is configured to protrude from the heat-pressing surface 211, and the two protrusions 212 are symmetrically arranged along a vertical direction. The first clamping arm 1 is provided with two avoidance grooves 14 at the corner, and the two avoidance grooves 14 are configured to fit the two protrusions 212, respectively. The two avoidance grooves 14 are symmetrically arranged on two sides of the pressing platform 11 along the vertical direction.

In this embodiment, a design of the two protrusions 212 and the two avoidance grooves 14 is conducive to preventing the garbage bag from getting stuck in a gap between the first clamping arm 1 and the second clamping arm 2, so as to ensure the garbage bag can be completely melted and sealed.

In an embodiment, in the process of gathering, the garbage bag enters the pressing platform 11, the two protrusions 212 symmetrically arranged along a vertical direction of the heat insulating base 21 and the two avoidance grooves 14 symmetrically arranged on two sides of the pressing platform 11 along the vertical direction can play a limiting role, which prevents the garbage bag from overflowing at the area of the pressing platform 11, ensures melting area covers the entire range and prevents the garbage bag from leaking and melting at the edge.

In an embodiment, the connecting end 16 of the first clamping arm 1 is provided with two connecting grooves 15, and the two connecting grooves 15 are symmetrically arranged on two sides of the pressing platform 11 along a vertical direction. The pressing platform 11 is provided with a connecting hole 151, and the connecting hole 151 is configured to pass through the two sides of the pressing platform 11 along the vertical direction. The two connecting grooves 15 are communicated with each other through the connecting hole 151. The strap 3 is connected with the first clamping arm 1 through the connecting hole 151, so as to drive the first clamping arm to rotate.

In an embodiment, an end of the second clamping arm 2 away from the heat insulating base 21 is provided with a flange 22. The flange 22 is configured to protrude along the length direction of the second clamping arm 2. A height of the flange 22 is less than a thickness of the heat insulating base 21. In a final stage of the gathering, the strap 3 is nearly perpendicular to the first clamping arm 1. At this time, a tip of the flange 22 is configured to pass through a through hole of the strap 3, and the strap stops gathering.

In an embodiment, the second clamping arm 2 includes a first limit groove 2131, a second limit groove 2132 and a third limit groove 214. The first limit groove 2131 is provided on an end of the heat insulating base away from the flange 22. The second limit groove 2132 is provided at an end of the flange 22 away from the first clamping arm. The third limit groove 214 is arranged at a middle of the heat-pressing surface 211. A first end of the third limit groove 214 is communicated with the first limit groove 2131, and a second end of the third limit groove 214 is communicated with the second limit groove 2132. The first limit groove 2131, the second limit groove 2132 and the third limit groove 214 are located on the same plane. The heating element 4 includes a first end portion, an extension portion and a second end portion connected in sequence. The first end portion is arranged in the first limit groove 2131. The extension portion is configured to extend from an end of the first limit groove 2131 along the third limit groove 214. The second end portion is arranged in the second limit groove 2132. In an embodiment, the heating element 4 has a U-shaped structure.

Through setting the first limit grove, the second limit groove 2132 and the third limit groove 214, and setting the heating element 4 in the first limit grove, the second limit groove 2132 and the third limit groove 214, a position of the heating element 4 is limited to avoid insufficient sealing of the garbage bag caused by offset and bending of the heating element 4. In addition, through setting the heat insulating base 21, and setting the heating element 4 in the first limit grove, the second limit groove 2132 and the third limit groove 214, heat of the heating element 4 is prevent from escaping from the heat insulating base 21, ensuring the heat can be concentrated and evenly applied to the garbage bag, and avoiding safety hazards caused by heat loss or local overheating.

In an embodiment, the heating element 4 is a strip-shaped heating wire. The third limit groove 214 is arranged along the length direction of the second clamping arm 2. In response to a case that the heating wire is located in the third limit groove 214, the heating wire partially protrudes from the heat-pressing surface 211.

In this embodiment, the heating element 4 is the strip-shaped heating wire, such design is conducive to linear melting of the garbage bag, so that the garbage bag can be split in two at the melting position. At the same time, such design is also conducive to reducing the contact area between the garbage bag and the heating element 4, which avoids damage to the garbage bag due to excessive heating.

In an embodiment, a top of the heat insulating base 21 is provided with a mounting groove 215. A bottom of the heat insulating base 21 is provided with a mounting hole 2151. The mounting groove 215 is communicated with the mounting hole 2151. The opening of the trash can is provided with a mounting part and a fastening component. The mounting part is provided in the mounting groove 215. The fastening component is configured to sequentially pass through the mounting part and the mounting hole 2151 for fastening.

The design of the mounting groove 215 and the mounting hole 2151 is conducive to fastening the second clamping arm 2 to avoid insufficient sealing of the garbage bag caused by loose of the second clamping arm 2.

In an embodiment, the heat-sealing unit, except for the heating element 4, is made of a heat-insulating material. The heating element 4 is electrically connected with a heating circuit.

In this embodiment, except for the heating element 4, a main body of the heat-sealing unit is made of the heat-insulating material, such design can effectively prevent the heat generated by the main body of the heat-sealing unit from being transferred to the external environment, which reduces the damage to garbage bags and trash cans due to overheating, avoids fires, and significantly improves the safety performance of the device. Meanwhile, an application of insulating materials helps to extend the service life of the heat-sealing unit and other non-heating components inside the trash can, which avoids problems of material aging and performance degradation caused by long-term heating, so as to enhance overall reliability and durability of the clamp-type heat-sealing structure for the trash can.

Figure 9:
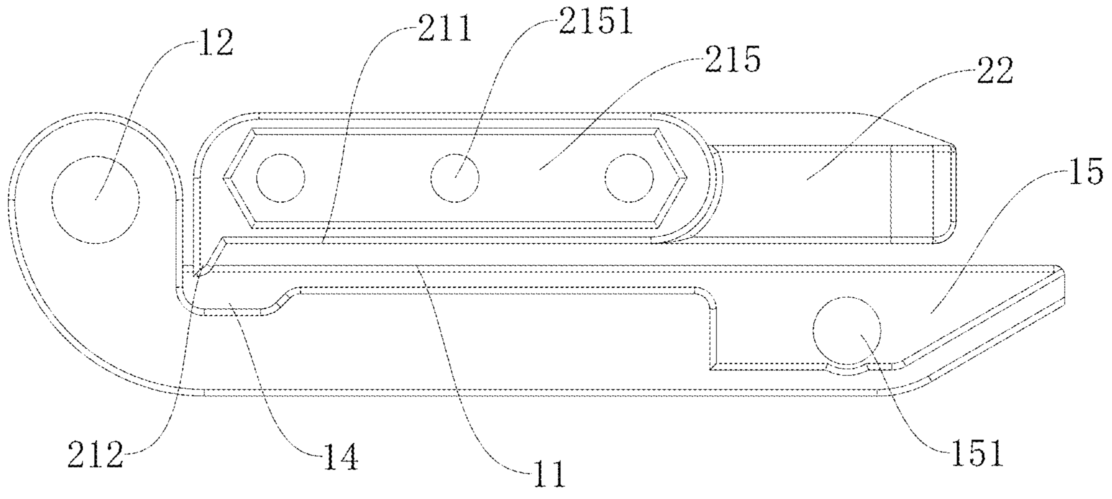
FIG. 9 is a top view of the clamping between the first clamping arm and the second clamping arm according to an embodiment of the present disclosure.
Figure 10:
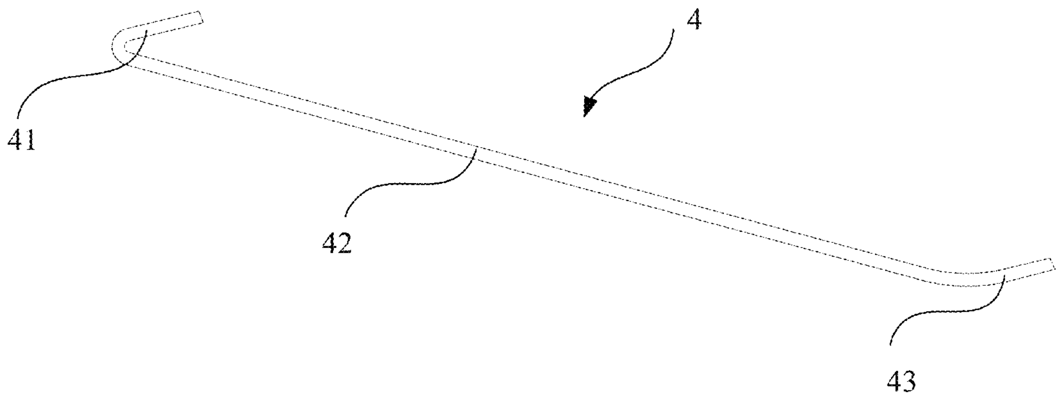
FIG. 10 is a structural diagram of a heating element according to an embodiment of the present disclosure.

Referring to FIG. 9, a using process of the clamp-type heat-sealing structure for the trash can in this embodiment is described as follows.

The garbage bag is gathered to the heat-sealing unit by the strap 3. Under the drive of the strap 3, the first clamping arm 1 rotates around an axis of the rotating shaft of the articulated end 17, so as to drive the connecting end 16 to be close to the second clamping arm 2 and clamp with the second clamping arm 2. The pressing surface 111 clamp the garbage bag towards the heat-pressing surface 211. The garbage bag filled with garbage is melted by the heating wire and is separated from remaining garbage bags, at this time, the garbage bag filled with garbage is melted and connected at its opening, and the remaining garbage bags are melted at their bottom. The strap 3 drives the first clamping arm 1 to rotate and reset along an original path around the rotating shaft of the articulated end 17, so that the melting and sealing of the garbage bag is completed.

According to disclosure and teaching of this specification, replacements and modifications can be made by those skilled in the art. Therefore, the present disclosure is not limited by disclosure above and specific embodiments. Any replacements and modifications made by those skilled in the art, shall fall within the scope of this application defined by the appended claims. In addition, some specific terms used in the specification are only illustrative, and are not intended to limit this application.

What is claimed is:

1. A clamp-type heat-sealing structure for a trash can, comprising: a heat-sealing unit; and a strap; wherein the heat-sealing unit and the strap are arranged on an opening of the trash can; and the clamp-type heat-sealing structure is configured to thermally seal a garbage bag after being closed; the heat-sealing unit comprises a first clamping arm and a second clamping arm; the first clamping arm comprises a connecting end and an articulated end; the connecting end of the first clamping arm is connected with the strap; the strap is configured to be gathered under a drive of an external force to close a garbage bag; the articulated end of the first clamping arm is rotatably connected with the opening of the trash can through a rotation mechanism; the second clamping arm is fixedly provided on the opening of the trash can, and is located at a side of the articulated end of the first clamping arm; and the strap is configured to drive the first clamping arm to rotate around the articulated end to be close to or away from the second clamping arm; and the second clamping arm comprises a heat insulating base and a heating element; the heat insulating base is located at the side of the articulated end, and the heating element is configured to heat and seal the garbage bag; a side of the heat insulating base facing towards the garbage bag is provided with a heat-pressing surface; the heat-pressing surface is arranged along a length direction of the second clamping arm, and the heating element is arranged on the heat-pressing surface; a side of the first clamping arm facing towards the garbage bag is provided with a pressing surface, and the pressing surface is configured to clamp the garbage bag with the heat-pressing surface.

2. The clamp-type heat-sealing structure of claim 1, wherein the first clamping arm is provided with a pressing platform configured to extend from the articulated end to the connecting end, and the pressing surface is formed on a side of the pressing platform.

3. The clamp-type heat-sealing structure of claim 2, wherein the articulated end of the first clamping arm is provided with a rotating groove; and the first clamping arm is configured to be driven by the strap to rotate around an axis of the rotating groove; and the first clamping arm has a 7-shaped cross section; and the axis of the rotating groove is configured to deviate from the pressing platform in a direction close to the second clamping arm, and a corner is formed between the pressing surface and a plane passing through the axis of the rotating groove.

4. The clamp-type heat-sealing structure of claim 3, wherein the second clamping arm comprises two protrusions; the two protrusions are provided on an end of the heat insulating base close to the rotation mechanism; each of the two protrusions is configured to protrude from the heat-pressing surface; and the two protrusions are symmetrically arranged along a vertical direction; and the first clamping arm is provided with two avoidance grooves at the corner, and the two avoidance grooves are configured to fit the two protrusions, respectively; and the two avoidance grooves are symmetrically arranged on two sides of the pressing platform along the vertical direction.

5. The clamp-type heat-sealing structure of claim 2, wherein the connecting end of the first clamping arm is provided with two connecting grooves, and the two connecting grooves are symmetrically arranged on two sides of the pressing platform along a vertical direction; and the pressing platform is provided with a connecting hole; and the two connecting grooves are communicated with each other through the connecting hole.

6. The clamp-type heat-sealing structure of claim 1, wherein an end of the second clamping arm away from the heat insulating base is provided with a flange; and the flange is configured to protrude along the length direction of the second clamping arm.

7. The clamp-type heat-sealing structure of claim 6, wherein the second clamping arm comprises a first limit groove, a second limit groove and a third limit groove; the first limit groove is provided on an end of the heat insulating base away from the flange; the second limit groove is provided at an end of the flange away from the first clamping arm; the third limit groove is arranged at a middle of the heat-pressing surface; a first end of the third limit groove is communicated with the first limit groove, and a second end of the third limit groove is communicated with the second limit groove; the first limit groove, the second limit groove and the third limit groove are located on the same plane; the heating element comprises a first end portion, an extension portion and a second end portion connected in sequence; the first end portion is arranged in the first limit groove; the extension portion is configured to extend from an end of the first limit groove along the third limit groove; and the second end portion is arranged in the second limit groove.

8. The clamp-type heat-sealing structure of claim 7, wherein the heating element is a strip-shaped heating wire; the third limit groove is arranged along the length direction of the second clamping arm; and in response to a case that the heating wire is located in the third limit groove, the heating wire partially protrudes from the heat-pressing surface.

9. The clamp-type heat-sealing structure of claim 1, wherein a top of the heat insulating base is provided with a mounting groove; a bottom of the heat insulating base is provided with a mounting hole; the mounting groove is communicated with the mounting hole; the opening of the trash can is provided with a mounting part and a fastening component; the mounting part is provided at the mounting groove; and the fastening component is configured to sequentially pass through the mounting part and the mounting hole for fastening.

10. The clamp-type heat-sealing structure of claim 1, wherein the heat-sealing unit, except for the heating element, is made of a heat-insulating material.

* * * * *